US008681216B2

(12) United States Patent
Atkinson

(10) Patent No.: US 8,681,216 B2
(45) Date of Patent: Mar. 25, 2014

(54) DEPTH-SENSING CAMERA SYSTEM

(75) Inventor: Lee Warren Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 353 days.

(21) Appl. No.: 13/255,794

(22) PCT Filed: Mar. 12, 2009

(86) PCT No.: PCT/US2009/001581
§ 371 (c)(1),
(2), (4) Date: Sep. 9, 2011

(87) PCT Pub. No.: WO2010/104490
PCT Pub. Date: Sep. 16, 2010

(65) Prior Publication Data
US 2011/0317005 A1   Dec. 29, 2011

(51) Int. Cl.
*H04N 7/18* (2006.01)
*H04N 9/64* (2006.01)

(52) U.S. Cl.
USPC ............................................. 348/135; 348/33

(58) Field of Classification Search
None
See application file for complete search history.

(56) References Cited

U.S. PATENT DOCUMENTS

| 5,416,510 A | 5/1995 | Lipton et al. |
| 6,263,422 B1 | 7/2001 | Wise et al. |
| 6,292,212 B1 * | 9/2001 | Zigadlo et al. .................. 348/33 |
| 6,487,304 B1 * | 11/2002 | Szeliski ......................... 382/107 |
| 7,174,033 B2 * | 2/2007 | Yukhin et al. ................. 382/115 |
| 2004/0002023 A1 | 1/2004 | Sowinski |
| 2006/0280360 A1 | 12/2006 | Holub |
| 2007/0115351 A1 * | 5/2007 | McCormack .................... 348/36 |
| 2007/0296835 A1 * | 12/2007 | Olsen et al. .................... 348/234 |
| 2008/0013632 A1 * | 1/2008 | Saito et al. ............... 375/240.17 |
| 2009/0231464 A1 * | 9/2009 | Nakamura .................... 348/229.1 |
| 2010/0289885 A1 * | 11/2010 | Lu et al. .......................... 348/61 |

FOREIGN PATENT DOCUMENTS

| JP | 08275182 A * | 10/1996 | ............... H04N 9/04 |
| WO | WO 2007057971 A1 * | 5/2007 | ................. 348/229.1 |

OTHER PUBLICATIONS

Bergen, James R., "Hierarchical Model-Based Motion Estimation", Lecture Notes in Computer Science, vol. 588, 1992, p. 237-252.*
Translation of JP 08275182A.*
Translation of WO 2007057971 A1.*
International Searching Authority, International Search Report and Written Opinion, Appln. No. PCT/US2009/001581, date of mailing Jan. 11, 2010, 11 p.

* cited by examiner

*Primary Examiner* — David Czekaj
*Assistant Examiner* — Janese Duley

(57) ABSTRACT

A depth-sensing camera system includes a common sensor configured to record color and infrared data from a target, an infrared illuminant that projects infrared light on the target, and a control logic that switches a mode of operation of the camera between a color mode and an infrared mode. When the camera system is in the infrared mode, the infrared illuminant operates to project the infrared light on the target and when in the color mode, the infrared illuminant is disabled. The camera system also includes a color buffer for storing color chroma and luma values and a depth buffer for storing infrared luma data.

18 Claims, 6 Drawing Sheets

DEPTH-SENSING CAMERA SYSTEM

BACKGROUND

Digital cameras typically transform a three-dimensional view into two dimensions, with the missing dimension being depth or distance between a focal plane of an image to be captured and the camera. Inclusion of depth may be desired in some applications. Prior efforts to provide this third dimension by either estimating or recording depth include stereoscopic cameras, time of flight sensors, and infrared sensors coupled with the camera's normal RGB sensors. Stereoscopic camera systems use two cameras to record light returned from an object from two different directions, and then compare the received (and processed) signals to estimate depth. Time of flight sensor systems rely on recording the two-way transmission time of light reflecting off an object. Camera systems that incorporate infrared sensors employ a color camera and a second camera that uses a projector to cast a grid of infrared light on the image and detect and measure the distortion of the returned infrared signal. These prior art solutions require complex camera systems to implement depth recording. The cost and complexity of these prior art camera systems present an economic challenge for many potential applications.

DESCRIPTION OF THE DRAWINGS

The detailed description will refer to the following figures in which like numerals refer to like items, and in which.

DETAILED DESCRIPTION

Current still and video digital cameras typically use one of two technologies to capture light reflected from an object: CCD (charge-coupled device) and CMOS (complimentary metal-oxide semiconductor). Each of these technologies employs an array of individual image sensors, or pixels, to transform the reflected light from one small portion of an image into electrons. The pixels are ordered in the array by rows and columns.

Some color digital cameras use the RGB (red/green/blue) format, and uses an RGB sensor having hundreds of thousands or millions of light sensitive transistors in rows and columns. A typical VGA resolution array has 300,000 pixels arranged as 480 rows by 640 columns of pixels. Red, Green, or Blue optical die is placed over the transistor sites in an array commonly known as a Bayer pattern. The Bayer pattern is 50 percent green, 25 percent red and 25 percent blue, where the green photo sensors are luminance-sensitive elements and the red and blue photo sensors are chrominance-sensitive elements. The Bayer pattern uses twice as many green elements as red or blue to mimic the human eye's greater resolving power with green light. The raw output of a Bayer-filter camera is referred to as a Bayer pattern image.

Each row of photo sensors (pixels) is read, one pixel and one row at a time, with an output electrical signal proportional to the light falling on the photo sensor. Reading data from all the pixels in the array produces a frame. In some cameras, each pixel is filtered to record only one of three colors, and thus the data from each pixel cannot fully determine color on its own. To obtain a full-color image, various demosaicing algorithms can be used to interpolate a set of complete red, green, and blue values for each point. The demosaicing can be done in-camera, producing a JPEG or TIFF image, or outside the camera using the raw data directly from the sensor. An image sensor processor (ISP) converts the information from a series of rows using the demosaicing algorithm, and then outputs pixel color data (chroma) and relative illumination data (luma) for each pixel. The output of the ISP is provided to the host system, for example a video recorder, display, or computing device. A frame may be completed 30 times every second.

Some digital cameras use the infrared (IR) spectrum to capture an image. Such a camera rejects visible light (using an IR bandpass filter, which only allows the IR wavelength light to pass). Since color is not relevant, the RGB sensor is replaced with a monochromatic sensor. The ISP provides luma data only.

Figure 1:
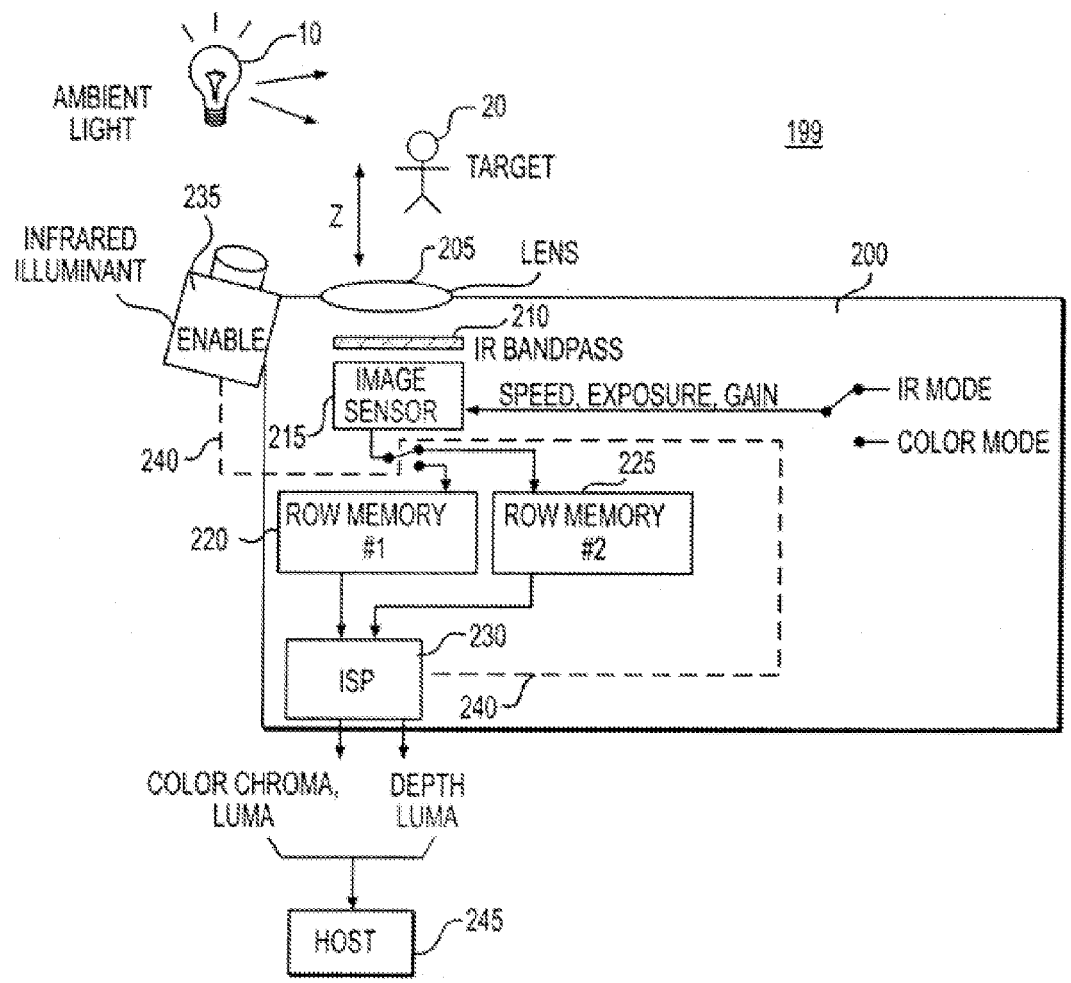
FIG. 1 is a block diagram illustrating an exemplary common sensor depth camera.

FIG. 1 is a block diagram of an exemplary depth-sensing camera system 199, which is capable of recording depth (distance) and motion in to and out from (i.e., in the Z-direction) a camera using a common sensor. As shown, common sensor camera 200 is set to capture light from source 10 reflected off target 20 and provide an output to host 245, which may be an attached and suitably programmed personal computer or other processing device. The camera 200 includes lens 205, IR bandpass filter 210, image sensor 215, memories 220 and 225, image signal processor (ISP) 230 and local illuminant 235. The image sensor 215 may be RGB sensor employing a Bayer pattern. Alternately, the image sensor 215 may be any digital camera-compatible sensor including monochrome, and may use other filter variations including CMY (cyan, magenta, yellow), RWB (red, white, blue), and CMY-W. Row memory 220 may be used to store color raw data and row memory 225 may be used to store IR (depth) raw data. The lens 205, IR bandpass filter 210, and image sensor 215 are sensitive to both color and the wavelength of the illuminant 235, and are used to collect color and IR light reflected of the target 20. Data corresponding to the collected light are stored in the memories 220 and 225.

The local illuminant 235 may be a structured projector or a simple flat source. The wavelength of light is in the near IR range of 800 nm to 900 nm wavelength. Enable signal 240 is used to enable the local illuminant 235. The enable signal 240 also causes storage of pixel data to be switched from row memory 220 to row memory 225. The enable signal 240 is provided to the local illuminant 235 when the camera 200 is in the IR mode. The enable signal 240 emanates from a control logic 300 (see FIG. 2A) and is activated on repeated rows of the image sensor 215. The control logic 300 also alternates the speed of the rows, and the ISP 230 offsets the camera's automatic gain control (AGC) and exposure information. Finally, the camera system 199 includes logic that detects relative motion (to or from) the target 20 and the camera 200. This logic may be performed by either the host 245 or by a processor in the camera 200 (e.g., by the ISP 230).

Figure 2A:
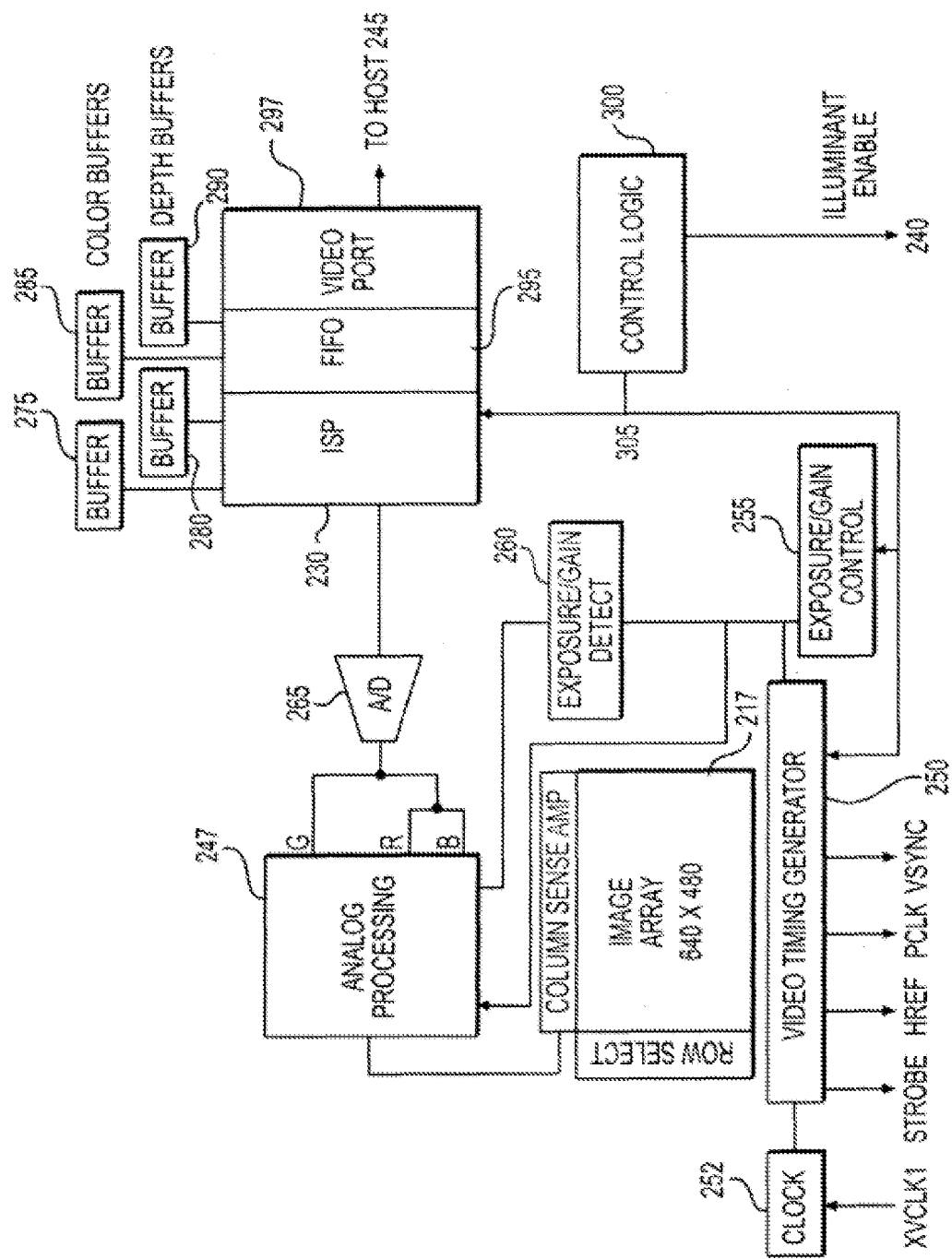
FIG. 2A is a block diagram illustrating exemplary signal processing components of the camera of FIG. 1.

FIG. 2A is a block diagram illustrating exemplary signal processing components of the camera 200. In the image sensor 215 (see FIG. 1), light falls onto the image array 217 and causes a transistor to proportionally conduct. A video timing generator 250, under control of clock 252, sequences which row of pixels is to be read, indexes thru every column of pixels in the row, and then repeats for every row to construct a frame. For each pixel, the analog value representing the illumination of the image array 217 is gain adjusted by exposure/gain control 255 and then digitized by an analog to digital converter 265 after analog processing by the processor 247.

Several rows of this color raw pixel data are stored in a row buffer 275, and then accessed by the ISP 230. When the camera 200 is in the color mode, the ISP 230 takes the color raw pixel data from the row buffer 275 and derives a pixel summary, expressed as the luma and chroma values per pixel. The chroma and luma values then are stored in color buffer 285. After further processing, described below, the chroma and luma data are stored in a FIFO buffer 295, where it is finally transferred to the host 245 thru a video port interface 297 for yet further processing, or alternatively, is processed further by the ISP 230 itself. As one skilled in the art will appreciate, the actual configuration of the buffers 275, 280, 285, and 290 and the row memories 220 and 225 (see FIG. 2) may vary and still result in a separation of the color and the "color+IR" data, as described above. For example, the buffers and row memories could be instantiated as a contiguous block of RAM in the camera 200, with the RAM accessible by the ISP 230. Furthermore, should the image sensor 215 be a monochrome sensor, the row memories 220 and 225 and the buffers 275 and 280 could be eliminated. Many combinations of memory are possible, some of which depend on the sensor type, among other factors.

When the camera 200 operates in the color mode, the exposure of the picture will change dynamically as a function of ambient light. If the histogram of the picture is dark, the gain of the analog value may be amplified or the exposure time lengthened. Exposure/gain detection circuit 260 detects when changes in ambient lighting may affect picture quality. Automatic gain control and exposure control circuit 255 adjusts the gain value as these lighting conditions change. When gain control is not sufficient to achieve the desired picture quality, the camera will function to increase the exposure time. If the exposure time is lengthened, the resultant frame rate (the number of frames captured every second) slows. The video timing generator 250 controls the length of the exposure and hence the number of frames per second captured. However, when the camera 200 operates in the IR mode, the frame rate should remain fixed at, for example, 30 frames per second. As will be discussed below, this potential difference in frame rates, and gain settings, between the IR mode and color mode, may require some compensation before a final three-dimensional frame image is produced. These exposure settings (gain and frame rate) are recorded by the ISP 230.

To implement both color and depth imaging with a common sensor, image array 217 of the image sensor 215 is constructed with two different camera outputs. Control logic 300 determines color and depth camera modes of the camera 200. Capture of the color row includes storing the color raw data into the row buffer 275 and the color buffer 285, as noted above. The ISP 230 considers multiple rows in the demosaicing process and retires the result into FIFO buffer 295. That is, the demosaicing process, and subsequent luma comparison, may proceed one row at a time, or in multiple rows, or for the entire frame. In a departure from current systems and methods, and as noted above, the ISP 230 records the exposure settings used for the color row in the FIFO buffer 295. These color settings include the exposure duration and the analog gain used for the exposure. In an embodiment of the camera 200, after capturing and processing data from the color row, the depth row data is captured and processed:

The control logic 300 enables the IR illuminant 235 using enable signal 240. The control logic 300 then changes the exposure control (exposure duration and analog gain) to a second value 305 corresponding to values appropriate for the IR illuminant 235. Because the IR illuminant 235 is known, the camera 200 does not need dynamic exposure timing (i.e., the frame rate is fixed).

The image sensor 215 stores the same row (or rows) just captured during the color mode. The raw data is stored in depth buffer 280. The pixel information stored in buffer 280 is the result of both ambient light plus the reflection of the target by the IR illuminant (i.e., "color+IR" data). Subsequent processing, when performed by the ISP 230, as described below, results in an IR luma value, which is stored in the depth buffer 290, and ultimately in the FIFO buffer 295.

Figure 2B:
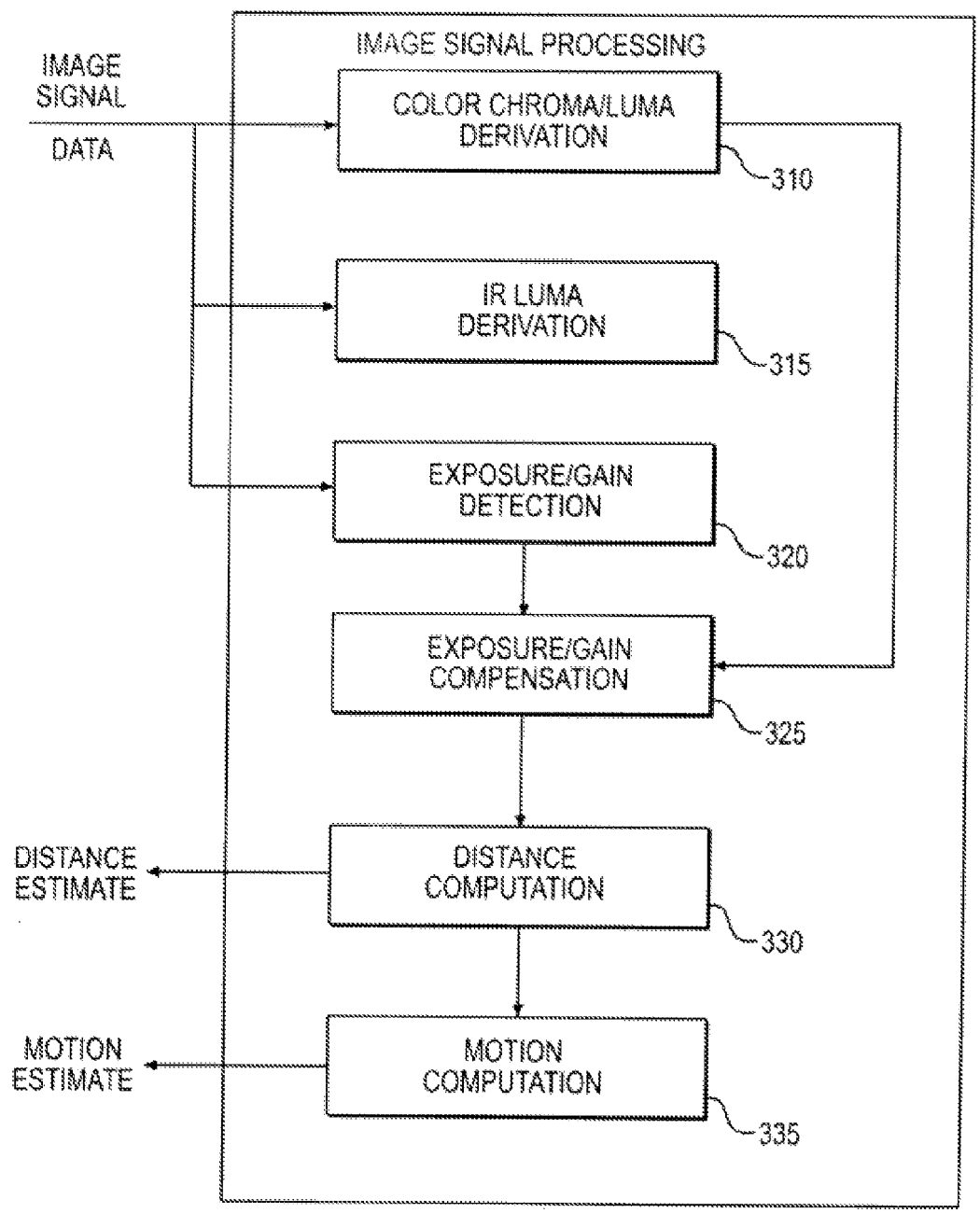
FIG. 2B is a further block diagram of the exemplary signal processing components of the camera of FIG. 1.

FIG. 2B further illustrates exemplary signal processing components of the camera 200 and its connectable host 245. In FIG. 2B, the processing components are shown as installed on one processor. However, many different variations of processing functions may be distributed between the camera 200 and the host 245, including performing all processing in the ISP 230, and FIG. 2B is not intended to limit the distribution of processing functions. In FIG. 2B, the processing components include a color chroma and luma derivation module 310 that computes chroma and luma data from pixels when the camera 200 operates in the IR mode. IR luma module 315 computes luma data associated with the image sensor data collected when the camera 200 operates in the IR mode. Exposure/gain detection module 320 records exposure and gain setting for the different camera modes (for IR, these values may be fixed). Exposure/gain compensation module 325 compensates color luma values, as described below. The IR luma module 315 uses the compensated color luma values from module 325 to produce the IR luma data. More specifically, the ISP 230, specifically the module 310, calculates the luma for the "color+IR" data for every pixel. Then, the ISP 230, specifically the module 315, subtracts the color luma stored in the color buffer 285 from each corresponding the "color+luma" derived for each corresponding pixel. The result is the IR luma, which is stored in depth buffer 290.

Because the exposure for the color buffer 285 was dynamic, the ISP 230 (the compensation module 325) may weigh the affect of exposure control on the color luma before subtracting the color luma from the "color+IR" luma. For example, if the analog gain used for the capture of the color data was four times higher and the exposure duration was 50 percent longer than fixed settings used for the depth row, the ISP 230 would reduce the color luma by a factor of six before subtracting the color luma from the "color+IR" luma.

Following determination of the IR luma, and once two or more complete frames (i.e., all rows and columns of the array 217) have been processed, distance computation module 330 may be used to estimate distance from the target 20 to the camera, and motion module 335 may be used to determine motion (velocity) of the target 20. As noted above, some of the processing functions may be completed outside the camera 200. In an embodiment, the distance and motion computations are completed in the host 245.

Distance may be determined if the illuminant is "structured," and the depth buffer data contains the contour of the grid. Distance can be determined by measuring the distance between the grid lines. Processes for distance measurement are disclosed, for example, in U.S. Pat. No. 7,174,033.

The motion module 335 uses successive frame illumination differences to determine motion in to or out from the camera 200. In an embodiment, motion detection using successive frames may be executed by the motion module 335 by comparing histograms associated with each of the frames. For example, the peak or average of frame luminance (that is, the extracted IR luma data) is compared for successive frames. If luma data for the more recent frames is higher (peak or average luminance) than for earlier frames, the target 20 is moving toward the camera 200.

In another embodiment, motion detection by the motion module 335 may begin with extracting specific feature(s) from the target 20 and then estimating motion by comparing the relative illumination of the selected feature(s) only. For example, the image of the target 20 could be subjected to an unsharp mask and edge detection techniques to isolate the foreground from the background. Use of unsharp masking and edge detection algorithms for feature extraction is well known in the art, and need not be described here in detail. The motion module 335 would then isolate specific features of interest, such as the hand or face, and then develop a histogram specific to that feature. Using this specific feature histogram, the motion module would compare IR luma data for successive frames to estimate motion.

Motion also may be estimated as the differential of distance as determined by the distance measurement module 330. That is, using distance estimations from successive frames, the motion module 335 may compute an estimate of distance.

In a further embodiment, the multiple means for estimating motion, disclosed above, may be employed by the camera system 199, and an average or weighted average value of motion can be derived considering these multiple means. Finally, when motion is estimated, distance may be estimated by the integral of motion of the target 20, or some feature of the target 20.

In another embodiment, as an alternative to alternating processing color and depth data for each row in sequence, the camera 200 may capture and process the color raw data for a frame and then for the next frame, capture and process depth raw data. In this embodiment, the same lama subtraction process described above is executed by the ISP 230.

In yet another embodiment, the camera system 199 may be implemented with a separate controller that provides some of the required processing capacity and is used also to control operation of a proxy of the target, or to control another device, such as a host computer, connectable by wired or wireless means to the controller. For example, the controller may include the motion and distance modules, and may receive the necessary information for execution of the motion and distance routines by wireless means from the camera 200. The controller may then send a signal to a host computer to control, for example, an avatar, or proxy, that represents the target. A more specific example might be a target that mimics a person driving a race car, and the avatar is the target's hands gripping a steering wheel on a computer display. Another example would be a target that mimics a boxer, with the avatar engaged in a boxing match. The controller also may be used to control a computer in response to motion and distance information form a target. Many other uses of the camera system 199 will be apparent to those skilled in the art, and are within the scope of the herein disclosed concepts.

Figure 3A:
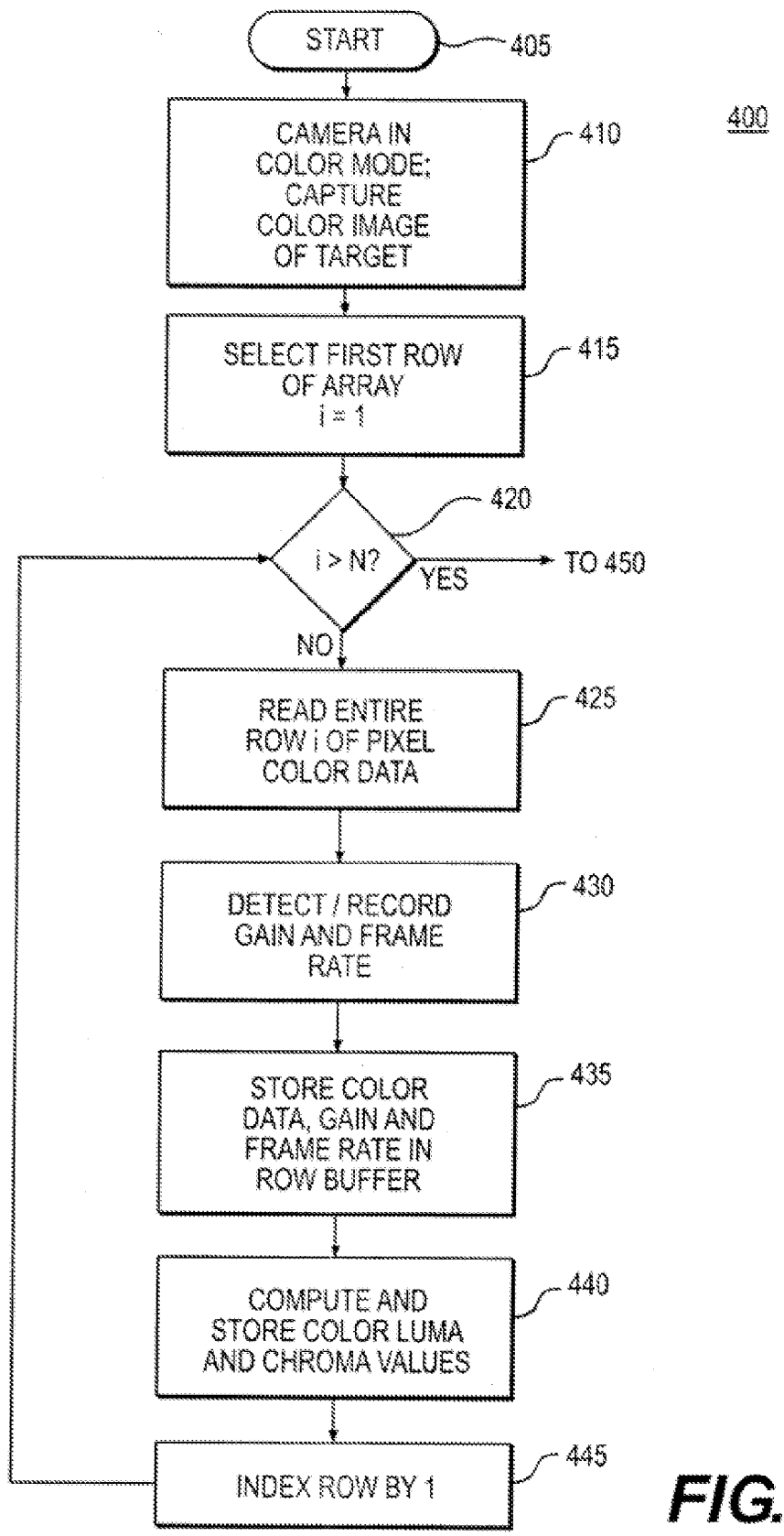
FIGS. 3A-3C is a flowchart illustrating an exemplary image processing routine used by the camera of FIG. 1.
Figure 3B:
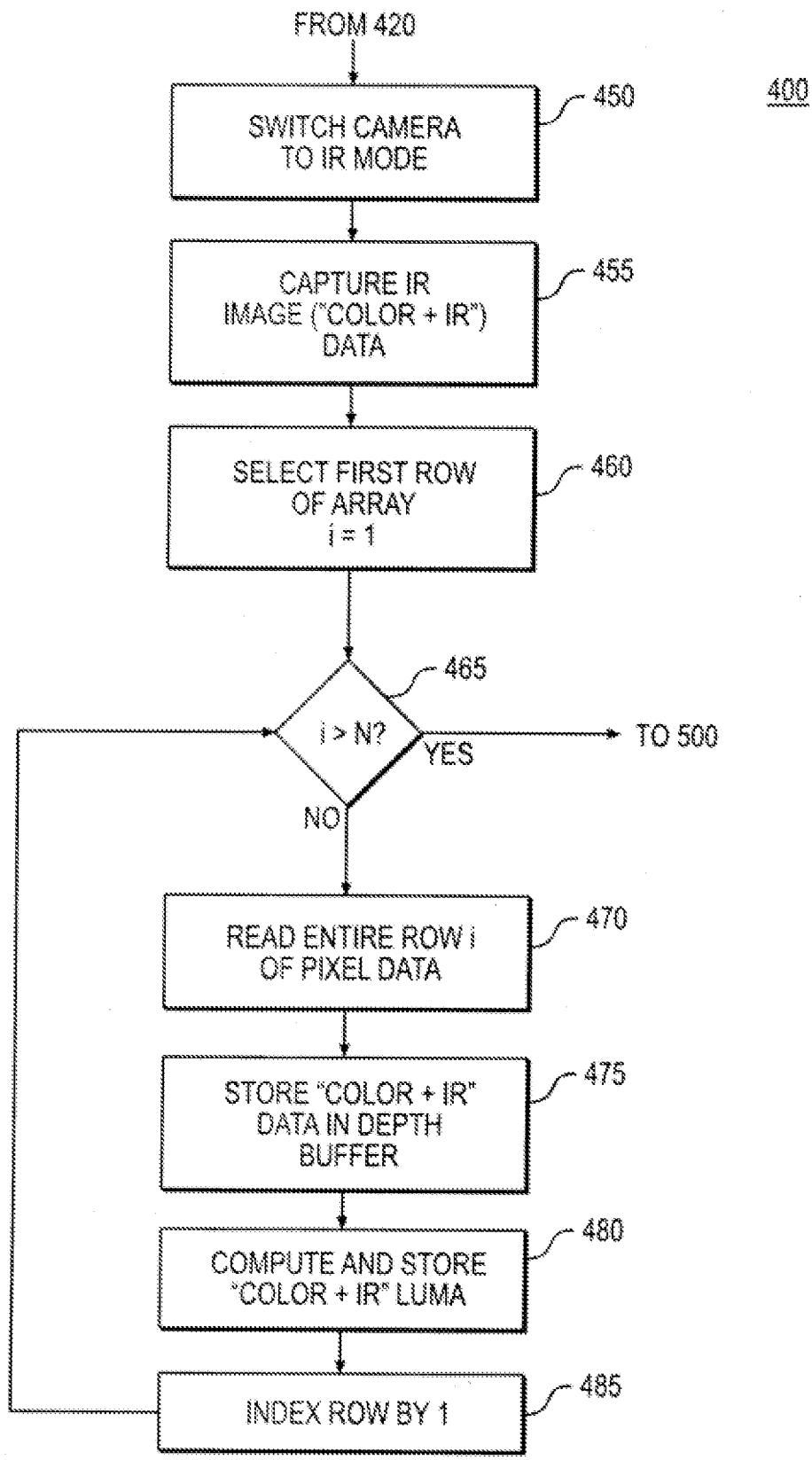
Figure 3C:
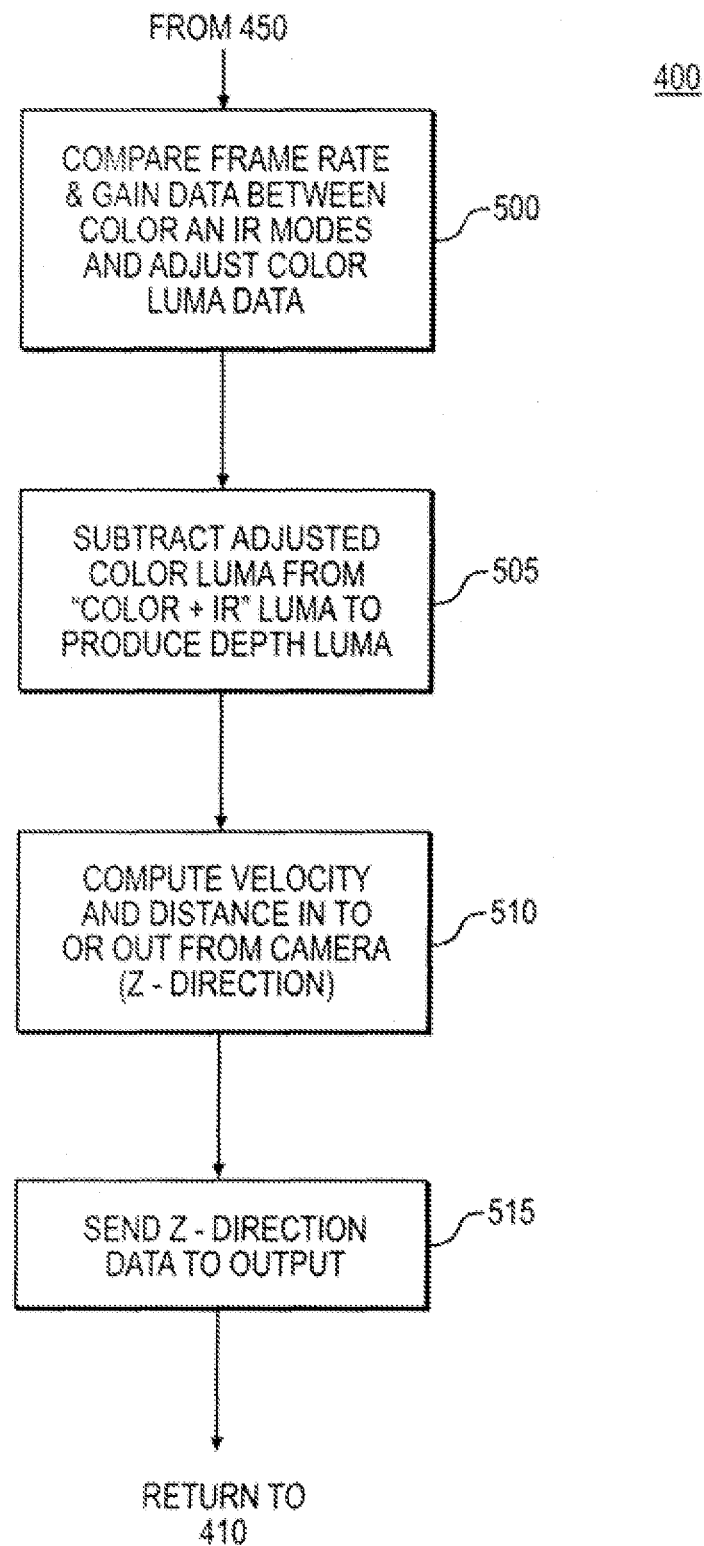

FIGS. 3A-3C is a flowchart illustrating an exemplary image capture and depth processing operation 400 of the common-sensor depth camera 200 of FIG. 1, in cooperation with the host 245. Note that the purpose for capturing the image is not relevant. That is, the image capture operation 400 may be used to support a still image capture, video recording, for computer control purposes, as part of a gaming operation, for face recognition, or for any other image capture purpose in which depth is relevant to the output. The operation 400 begins in block 405 when a user activates the camera 200 to capture an image.

In block 410, the camera 200 is in or is placed in the color mode by the control logic 300 so as to capture a color frame of the target 20. In block 415, with the color data acquired by the array 217, the ISP 230 selects the first row i=1 of n rows of the array 217. In block 420, the ISP checks that i is not greater than n, and if not, the operation 400 proceeds to block 425. Otherwise, the operation 400 moves to block 450. In block 425, the ISP 230 reads the entire row i of pixel color data. In block 430, the ISP 230, if not already completed, records gain and frame rate for the color data. In block 435, the ISP 230 stores the color data, gain, and frame rate in row buffer 275 and in block 440, the ISP 230 computes color luma and chroma values and stores the values in the color buffer 285.

Following capture and processing of the color data, the camera 200 switches to the IR mode, block 450. in block 455, the camera 200 captures an IR image ("color+IR"). In block 460, the ISP 230 selects the first row i=1 of n rows of the array 217. In block 465, the ISP checks that i is not greater than n. If i is greater than n, the operation 400 proceeds to block 500. Otherwise, the operation 400 proceeds to block 470. In block 470, the ISP 230 reads the selected row of pixel data. In block 475, the ISP 230 stores the read "color+IR" data in depth buffer 280. In block 380, the ISP 230 computes "color+IR" luma values and stores the values in the depth buffer 290. The operation 400 then indexes the row number by 1, block 485.

In block 500, the ISP 230 compares gain and frame rate data between the color and IR modes and adjusts the color luma by the gain/frame rate data. For example, if the analog gain used for the capture of the color data was four times higher and the exposure duration was 50 percent longer than fixed settings used for the depth row, the ISP 230 would reduce the color luma by a factor of six before subtracting the color luma from the "color+IR" luma. In block 505, the ISP 230 subtracts the adjusted color luma from the "color+IR" luma to produce depth data. Next, in block 510, the ISP 230 compares the current depth data to depth data from prior frames and computes depth and a velocity component of the target 20 into or out of the image plane (i.e., the Z-component of motion). In block 515, the ISP 230 sends the depth and velocity component data, and the color data from the frame to the video port 297 for transmission to the host 245. Following block 515, the operation 400 returns to block 410.

Although the operation 400 has been described as proceeding according to a specific sequence, those skilled in the art will appreciate that other sequences within the concepts disclosed herein are possible. For example, the image processing provided by the ISP 230 may proceed on a line (or row) by line basis. Similarly, multiple lines and frames may be processed for the color mode followed by a similar processing for IR mode.

The various disclosed embodiments for signal processing associated with the camera 200 of FIG. 1 may be implemented as software, hardware, firmware, or any combination of these technologies. The programming may be implemented as one or more modules (also referred to as code subroutines, or "objects" in object-oriented programming). The location of the programming will differ for the various alternative embodiments. The programming for signal processing, for example, may be implemented on the camera 200 (e.g., the ISP 230) or on the connectable host 245. When implement on the host 245, the programming may he accessed by a processor or processors of the host 245 from a long-term storage media of some type, such as semiconductor, magnetic, and optical devices, including a removable disk or a hard drive. The programming may be distributed on such media, or may be distributed to from the memory or storage of one host 245 over a network of some type to other hosts. Alternatively, the programming is embodied in the memory (such as memory of a handheld portable electronic device)

and accessed by a processor using a bus. The techniques and methods for embodying programming in memory, on physical media, and/or distributing software code via networks are well known to those skilled in the art.

As a computer-readable medium, the image processing program may take the form of a computer program product on a computer-usable storage. medium having computer-usable program code embodied in the medium. Any suitable computer usable or computer readable medium may be utilized. The computer-usable or computer-readable medium may be, for example but not limited to, an electronic, magnetic, optical, electromagnetic, or semiconductor system, apparatus, device, or medium. More specific examples (a non-exhaustive, list) of the computer-readable medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

The signal processing methods have described with reference to flowchart illustrations and/or block diagrams of methods, apparatuses (systems) and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a result, such that the instructions, which execute via the processor of the computer or other programmable data processing apparatus, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A depth-sensing camera system, comprising:
    a common sensor configured to record color and infrared data from a target;
    an infrared illuminant that projects infrared light on the target;
    a control logic that switches a mode of operation of the camera between a color mode and an infrared mode, wherein when in the infrared mode, the infrared illuminant operates to project the infrared light on the target and when in the color mode, the infrared illuminant is;
    a distance module that uses depth data to estimate distance of the target from the camera;
    a motion module that uses depth data and estimated distance to compute motion of the target with respect to the camera;
    a color buffer for storing color chroma and luma values; and
    a depth buffer for storing infrared luma data.

2. The camera system of claim 1, further comprising a processor encoded with processing logic, the processing logic, comprising:
    a color module that computes the color chroma and luma values; and
    an infrared module that computes the infrared luma values.

3. The camera system of claim 2, wherein the processing logic further comprises:
    an exposure/gain module that records frame rate and gain settings when the camera operates in the color mode; and
    a computation module that corrects the color luma values according to the frame rate and gain settings and subtracts the color luma values from the infrared luma values to produce the depth data.

4. The camera system of claim 1, wherein the motion of the target is based on depth data from successive frames taken of the target.

5. The camera system of claim 4, wherein the motion module further comprises a luma comparison routine that compares luma data among successive frames, and wherein an increase in luma values indicates motion of the target toward the camera.

6. The camera system of claim 4, wherein the motion module comprises a distance differential routine that estimates motion of the target based on distance changes among successive frames.

7. The camera system of claim 1, wherein the processing logic is contained in a processor within the camera.

8. The camera system of claim 1, wherein the infrared illuminant is a flat illuminant.

9. The camera system of claim 1, wherein the infrared illuminant is a structured illuminant.

10. The camera system of claim 1, further comprising a controller separate from the camera body, wherein the controller comprises the motion and distance modules, and wherein target motion and distance are used by the controller to generate control signals for operation of a host computer.

11. A method for determining motion of an object in an image scene using a camera system, comprising the steps of:
    capturing, in a digital camera having a common image sensor, a color image of an object in a first color frame;
    processing color pixel data from the color image to provide color chroma and luma data;
    storing the color chroma and luma data;
    switching the common image sensor to an infrared (IR) mode and capturing a color+IR image in a first IR frame;
    processing color+IR pixel data from the color+IR image to provide color+IR luma data;
    storing the color+IR luma data;
    subtracting the color luma data from the color+IR luma data to produce depth data;
    repeating for successive color and IR frames; and
    determining object motion based on depth data from the first and successive color and IR frames.

12. The method of claim 11, further comprising:
    detecting and recording image gain and frame rate when the camera operates in the color mode; and
    correcting the color luma data according to the gain and frame rate.

13. The method of claim 11, wherein the steps of adjusting the color +IR luma data and determining object motion are completed in a device separate from the digital camera.

14. The method of claim 11, wherein the step of determining object motion comprises comparing depth data among the successive frames, wherein an increase in the depth data indicates motion of the object toward the digital camera.

15. The method of claim 11, wherein the camera comprises a structured IR illuminant, further comprising the step of in the IR mode, projecting a grid on the object using the structured IR illuminant, wherein the grid is distorted by the object.

16. The method of claim 15, further comprising the steps of:
detecting the distortions in the grid; and
computing distance of the object from the digital camera based on the detected distortions.

17. A non-transitory computer readable medium comprising programming that when executed produces the steps of:
processing color pixel data captured by a camera having a common sensor to provide color chroma and luma data from an object in a first color frame;
storing the color chroma and luma data;
switching the camera to an infrared (IR) mode to produce color+IR data in a first IR frame;
processing color+IR pixel data to provide color+IR luma data from the object in a first IR frame;
storing the color+IR data;
subtracting the color luma data from the color+IR luma data to produce depth data;
repeating for successive color and IR frames; and
determining object motion based on depth data from the first and successive color and IR frames.

18. The non-transitory computer readable medium of claim 17, wherein the programming when executed produces the further steps of:
detecting distortions in a grid produced by an IR illuminant when operating the camera in the IR mode; and
computing distance of the object from the camera based on the detected distortions.

\* \* \* \* \*

UNITED STATES PATENT AND TRADEMARK OFFICE
CERTIFICATE OF CORRECTION

PATENT NO. : 8,681,216 B2  
APPLICATION NO. : 13/255794  
DATED : March 25, 2014  
INVENTOR(S) : Lee Warren Atkinson Page 1 of 1

It is certified that error appears in the above-identified patent and that said Letters Patent is hereby corrected as shown below:

In the Claims:

In column 7, line 62, in Claim 1, delete "is;" and insert -- is disabled; --, therefor.

In column 8, line 66, in Claim 13, delete "color +IR" and insert -- color+IR --, therefor.

Signed and Sealed this  
Twenty-fourth Day of June, 2014

Michelle K. Lee  
*Deputy Director of the United States Patent and Trademark Office*